US008775458B1

(12) United States Patent
Skare

(10) Patent No.: US 8,775,458 B1
(45) Date of Patent: Jul. 8, 2014

(54) SYSTEM AND METHOD FOR RETRIEVING AND DISPLAYING SEARCH RESULTS WITHOUT NAVIGATING FROM A CURRENTLY DISPLAYED WINDOW

(75) Inventor: Travis Michael Skare, Mountain View, CA (US)

(73) Assignee: Google Inc., Mountain View, CA (US)

( * ) Notice: Subject to any disclaimer, the term of this patent is extended or adjusted under 35 U.S.C. 154(b) by 127 days.

(21) Appl. No.: 13/223,142

(22) Filed: Aug. 31, 2011

(51) Int. Cl.
*G06F 7/00* (2006.01)
*G06F 17/00* (2006.01)

(52) U.S. Cl.
USPC .......................................... 707/766; 707/768

(58) Field of Classification Search
USPC .................................. 707/766, 765, 707, 768
See application file for complete search history.

(56) References Cited

U.S. PATENT DOCUMENTS

| 6,874,126 B1 * | 3/2005 | Lapidous ...................... 715/711 |
| 7,587,392 B2 * | 9/2009 | Jhaveri et al. ......................... 1/1 |
| 7,672,932 B2 * | 3/2010 | Hood et al. ............ 707/999.003 |
| 8,060,524 B2 * | 11/2011 | Schechter et al. ............ 707/768 |
| 2006/0064411 A1 * | 3/2006 | Gross et al. ...................... 707/3 |
| 2007/0233692 A1 * | 10/2007 | Lisa et al. ........................ 707/10 |

* cited by examiner

*Primary Examiner* — Usmaan Saeed
*Assistant Examiner* — Paul Kim
(74) *Attorney, Agent, or Firm* — McDermott Will & Emery LLP

(57) ABSTRACT

A system and method is disclosed for automatically receiving and displaying search results without navigating from a currently displayed webpage. A web browser stores is integrated with a search toolbar for receiving a search query and transmitting the query to a search engine. A search query may be transmitted and search results received and displayed without navigating from a currently displayed webpage. The toolbar causes to be displayed a search window above and at least partially overlapping the currently displayed webpage, the search window including the search results.

18 Claims, 5 Drawing Sheets

SYSTEM AND METHOD FOR RETRIEVING AND DISPLAYING SEARCH RESULTS WITHOUT NAVIGATING FROM A CURRENTLY DISPLAYED WINDOW

TECHNICAL FIELD

The subject technology relates generally to web browsers, namely web browser toolbars.

BACKGROUND

Web browser-integrated search toolbars may allow users to input searches without navigating from a displayed web page. Once a search toolbar receives a query from a user the browser is redirected from a currently displayed website to a search engine website, along with the query, to retrieve a list of search results. Consequently, the user's activities with regard to the currently displayed website are terminated, as only one web session may be active in the content area of the browser at any one time. If the user wishes to return to the previous session, the user must terminate navigation of the search results prior to the expiration of the session.

SUMMARY

The subject technology provides a system and method for automatically receiving and displaying search results without navigating from a currently displayed webpage. According to one aspect, the method includes receiving a search query at a search toolbar, transmitting the search query to a search engine without navigating from the currently displayed webpage, receiving search results corresponding to the search query without navigating from the currently displayed webpage, and displaying a search window above and at least partially overlapping the currently displayed webpage, the search window including the search results. In another aspect, the search results may be collected and stored in a memory-resident object. In this regard, the search results may be provided for display to the search window from the memory-resident object. The search results may be automatically updated in the memory-resident object as the search query is updated in the toolbar, and not provided to the search window for display until the search query is stable for a predetermined time or a carriage return is received at the search toolbar. In a further aspect, the method may further include receiving a request to close the search window, navigating from the currently displayed webpage to one or more other web pages, receiving a request to reactivate the search window, and displaying the search window including the previously displayed search results.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

There is currently no means to display and navigate search results returned from a search toolbar without navigating from a currently displayed website.

Figure 1:
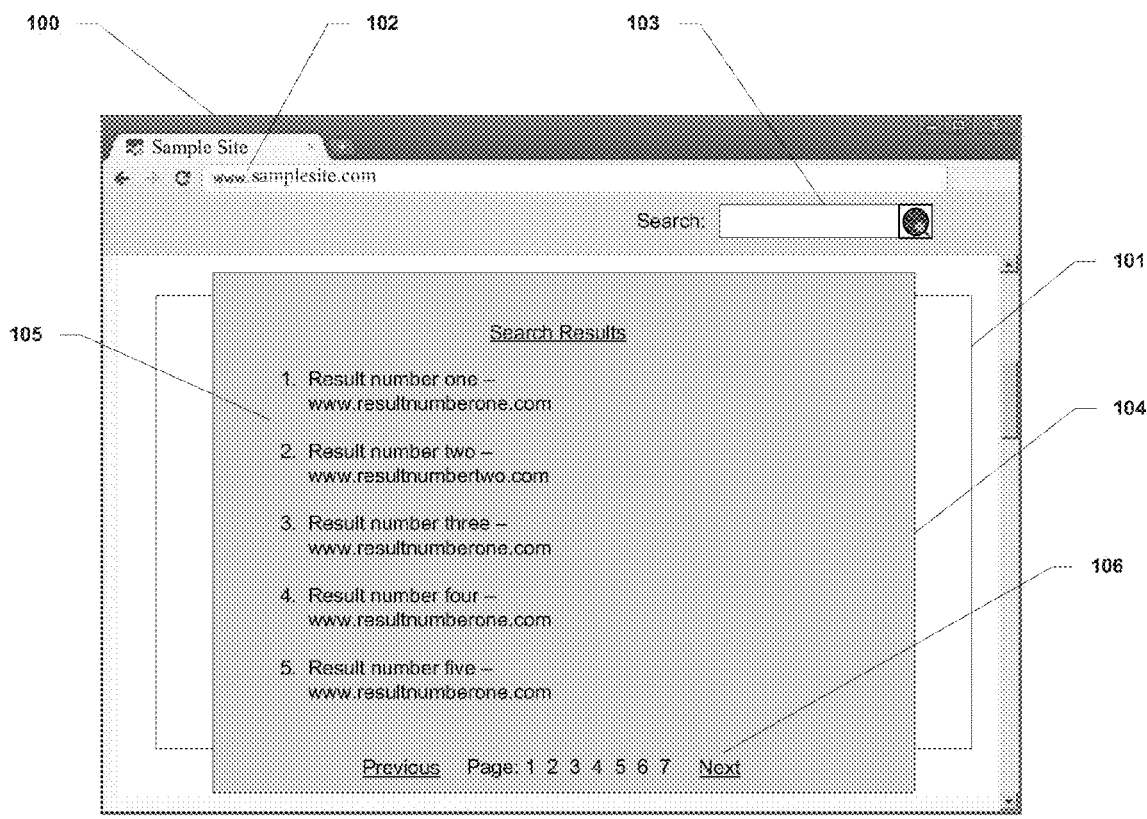
FIG. 1 is a first exemplary diagram of a web browser, including a toolbar and a search window according to one aspect of the subject technology.

FIG. 1 is a first exemplary diagram of a web browser, including a toolbar and a search window according to one aspect of the subject technology. The subject technology provides a computer-enabled device (for example, device 401 of FIG. 4) for display and use of a web browser 100. Web browser 100 includes a content area 101 for displaying websites displayed by browser 101, an address bar 102 for user-generated input of a web address, and one or more search toolbars 103 for user-generated input of a search query. On input of a web address to address bar 102, browser 100 will navigate to a corresponding website for display in content area 101. On input of a search query to search toolbar 103, a search window 104 may be displayed.

Search window 104 may be generated as a result of instructions (for example, JavaScript) executed by toolbar 103. Search window 104 may be in the form of a new window (for example, a browser window, pop-up content viewer, or the like) that is displayed above and/or overlapping content area 101. Search window 104 may display search results 105 received from a search engine (see FIG. 2) and corresponding to the inputted search query at search toolbar 103, without causing any navigation of the browser from the information displayed in content area 101. In this regard, search window 104 acts in connection with search toolbar 103, yet independently of content area 101 displayed below. In one aspect, search window 104 may load a webpage (for example, with Javascript), and the webpage may fetch and display search results 105 from a remote server (see FIG. 4). Search window 104 may not include an address bar, status bar, toolbar, or the like, but, rather, may only include only a content area for displaying search results 105. Search window 104 may be configured to float centered above content area 101 and track to the main window of browser 100 as the main window is repositioned, resized, and/or the like. In this regard, search window 104 may be modal while search toolbar 103 is actively processing and/or transmitting a search query, and/or receiving search results.

Search results 105 may be displayed in search window 104 and automatically updated as a search query is updated at toolbar 102. For example, when a portion of a query is received at toolbar 102, the search engine may process that portion and return corresponding search results to search window 104 in real-time. Search window 104 may further be configured to allow navigation of search results 105 through a paged display. For example, one or more links or buttons 106 may be included and labeled "next" or "previous" to display a predetermined number of results (for example, 20) at a time. Updating and/or paging through results may be accomplished without causing browser 100 to navigate from the information displayed in content area 101. Once a result is selected, however, search window 104 may be closed, and the information (for example, webpage) corresponding to the selected result displayed in content area 101.

Figure 2:
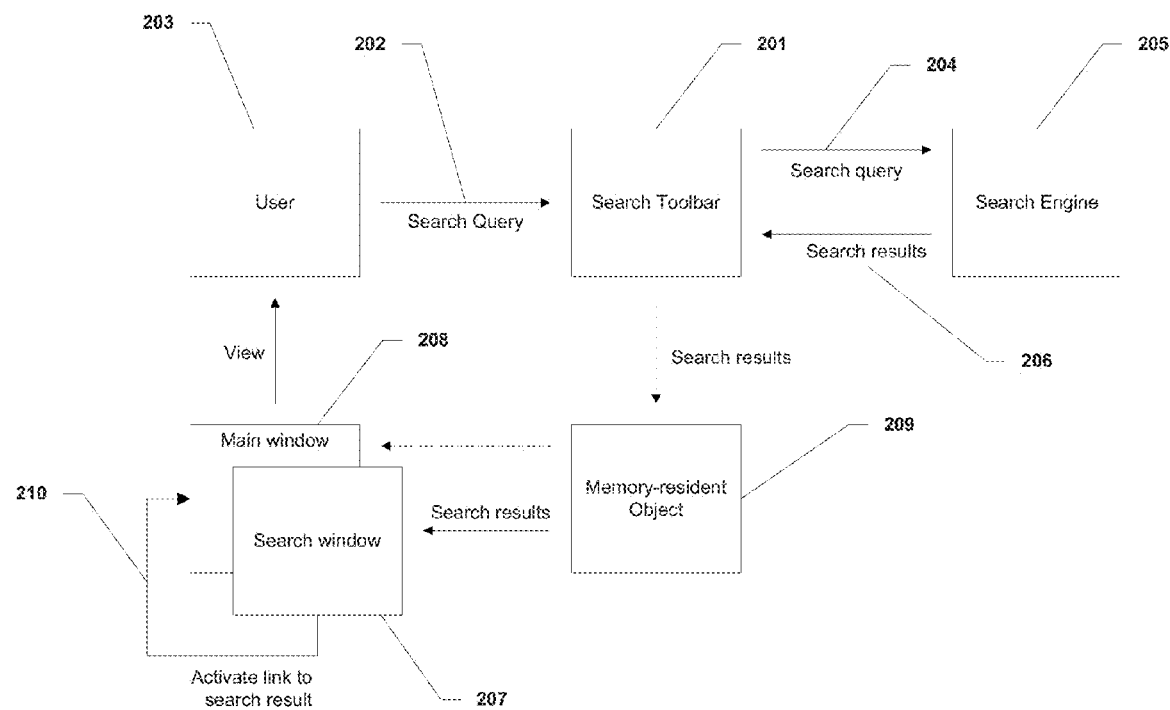
FIG. 2 is an exemplary diagram of a system for automatically receiving and displaying search results without navigating from a currently displayed webpage, including a search window and a memory-resident object for storing search results, according to one aspect of the subject technology.

FIG. 2 is an exemplary diagram of a system for automatically receiving and displaying search results without navigating from a currently displayed webpage, including a search window and a memory-resident object for storing search results, according to one aspect of the subject technology. A search toolbar 201, on receiving a search query 202 from a user 203, may be configured to transmit the search query 204 to a search engine 205 for the generation of search results 206. Toolbar 201 (for example, via a webpage generated by toolbar 201) may receive search results 206 and display them in a search window 207 without causing the browser main window 208 (for example, content area 101 of browser 100) from navigating from a currently displayed webpage.

In some aspects, search results 206 may be collected and stored in a memory-resident object 209 for use by search window 207. As described previously, search results 206 may be automatically updated as search query 204 is updated at search toolbar 201. Toolbar 201 may be configured to automatically update memory-resident object 209 with updated search results 206 as search query 204 is updated at search toolbar 201. In one aspect, search results 206 may remain in memory-resident object 209 and not displayed in search window 207 until the search query is stable for a predetermined time or considered final. Toolbar 201 may be configured to determine the search is stable once user 203 ceases to update the search query for a predetermined time (for example, three seconds), or final when a carriage return is received at toolbar 201.

In a further aspect, search results 206 may remain stored in memory-resident object 209 until it is deleted. In one example, browser 100 and/or toolbar 201 may receive a request from user 203 to close search window 207. User 203 may choose to return to viewing a currently displayed webpage in content area 101, and then navigate away from the webpage. On a user-generated instruction, browser 100 may navigate from the currently displayed webpage to one or more other web pages. After browsing other websites for a period of time, browser 100 and/or toolbar 201 may receive a request from user 203 to reactivate search window 207. The request may be made, for example, by a button or control on toolbar 201 (for example, a graphic next to its input). On receiving a request to reactivate search window 207, toolbar 201 may be configured to display search window 207 in the previously described manner, access memory-resident object 209 to retrieve search results 206, and then display them in search window 207. Accordingly, the previously generated search results 206 may be loaded from memory-resident object 209 and displayed in a new search window 207.

Search results 206 may include all results received from search engine 205, or a portion thereof. Memory-resident object 209 may facilitate a paged display of results 206 in search window 207 (for example, as described with respect to search window 104) by internally organizing the results (for example, as a data structure within memory-resident object 209) for efficient retrieval by toolbar 201 and/or search window 207. For example, as some results are displayed in a first paged display, subsequent pages of results may be downloaded and cached within memory-resident object 209 for later display by search window 207. Once a link to one of the search results 206 is selected and/or activated 210, browser 100 and/or toolbar 201 may be configured to close search window 207 and cause browser 100 to navigate to a webpage corresponding to the link selected and/or activated.

Browser 100 may also include a control for deletion of memory-resident object 209, or its contents or a portion thereof. The control may be included along with other similar controls found in the browser's "properties" or privacy settings. Search results 206 may also be deleted when the browser's cache is cleared. Search toolbar 201 may further maintain a history log of searches performed and/or displayed in search window 207. According to one aspect, a search may be stored in the history log as an web address URL. In another aspect, the URL may be stored in a database or other storage location. Toolbar 201 may be configured to wait to store URL after a predetermined time. For example, a user may elect to make several updates to a search query before settling on a final query. Search results may then be continually updated within memory-resident object 209 (and/or, in some cases, search window 207), but the search not recorded in the history log until user 203 ceases to update the search query for a predetermined period of time (for example, three seconds).

Figure 3:
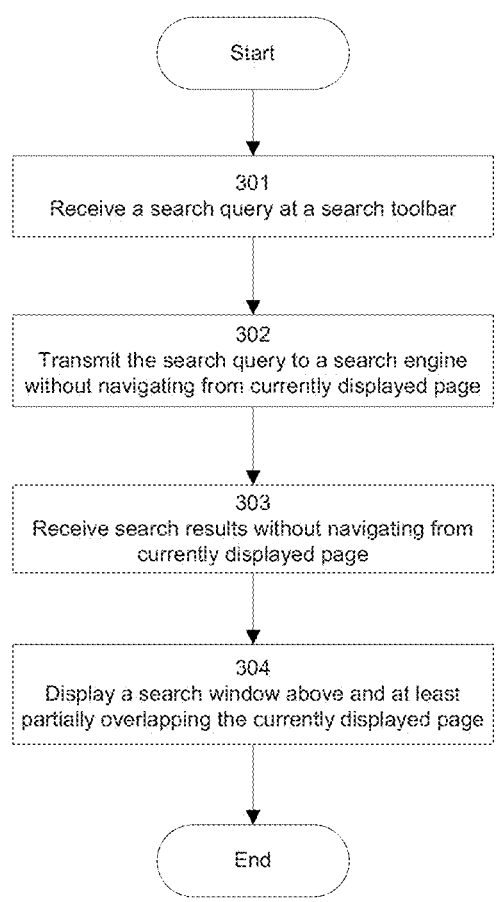
FIG. 3 is a flowchart illustrating an exemplary process for automatically receiving and displaying search results without navigating from a currently displayed webpage according to one aspect of the subject technology.

FIG. 3 is a flowchart illustrating an exemplary process for automatically receiving and displaying search results without navigating from a currently displayed webpage according to one aspect of the subject technology. In a first process 301, a search query is received at a search toolbar. The search toolbar may be integrated with a web browser, and may be separate from the address bar and content area of the main browser window. The search query may be generated by user input into a text box at the toolbar, for example, upon receiving text and a carriage return, receiving a selection of text (for example, a drop down) that is generated from text of a partial search term, or upon a predetermined time after text was received. In a second process 302, the search query is transmitted to a search engine. In this regard, transmission of the search query may be made by the browser without navigating from the currently displayed webpage. Upon processing by the search engine, in a third process 303, search results corresponding to the search query are received. In some aspects, the search results may be received into memory without requiring a navigation from the currently displayed webpage. In a fourth process 304, a search window is displayed above and at least partially overlapping the currently displayed webpage, the search window including the search results. On selection of one of the displayed search results, the search window may close and the browser navigated to display information corresponding to the selected result in the content area of the main browser window.

Figure 4:
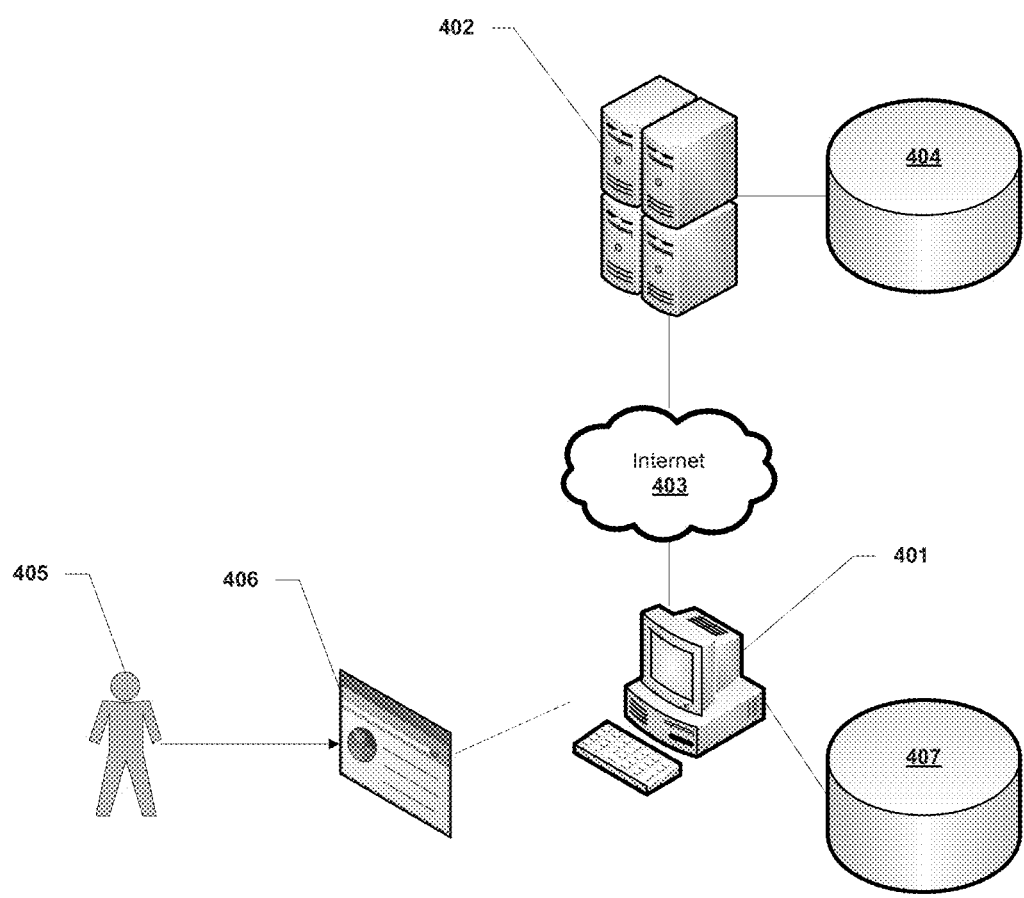
FIG. 4 is an exemplary diagram illustrating server and database components of a system for automatically receiving and displaying search results without navigating from a currently displayed webpage according to one aspect of the subject technology.

FIG. 4 is an exemplary diagram illustrating server and database components of a system for automatically receiving and displaying search results without navigating from a currently displayed webpage according to one aspect of the subject technology. A system compatible with the subject technology includes a computer-enabled device 401 (for example a personal computer, PDA, smart phone or the like) connected to one or more servers 402 via a network connection 403 (for example, the Internet, LAN/WAN, or the like). One or more servers 402 may include a search engine for generating search results in response to a search query. The one or more servers 402 may be connected to one or more storage locations 404 for storing search-related content. A user 405 may use device 401 to query the one or more servers 402. User 405 may interact with a user interface 406 (for example, browser 100) provided by device 401, and integrated with a toolbar having controls (for example, drop down lists, selection choices, text inputs or the like) for receiving a search query and transmitting it to a search engine website on the one or more servers 402. In one aspect, the one or more servers 402 are operable to receive and respond to the search query sent from user interface 406, and to generate one or more search results to be displayed at user interface 406. On receipt by user interface 406, the search results may be stored and/or updated in a local memory storage 407. Storage 407 may include a memory-resident object, a file on a local file system, a database, or the like. In other aspects, the search results may be stored, update, and/or retrieved from a data cloud, remote from device 401 (for example, a centralized database 404).

Figure 5:
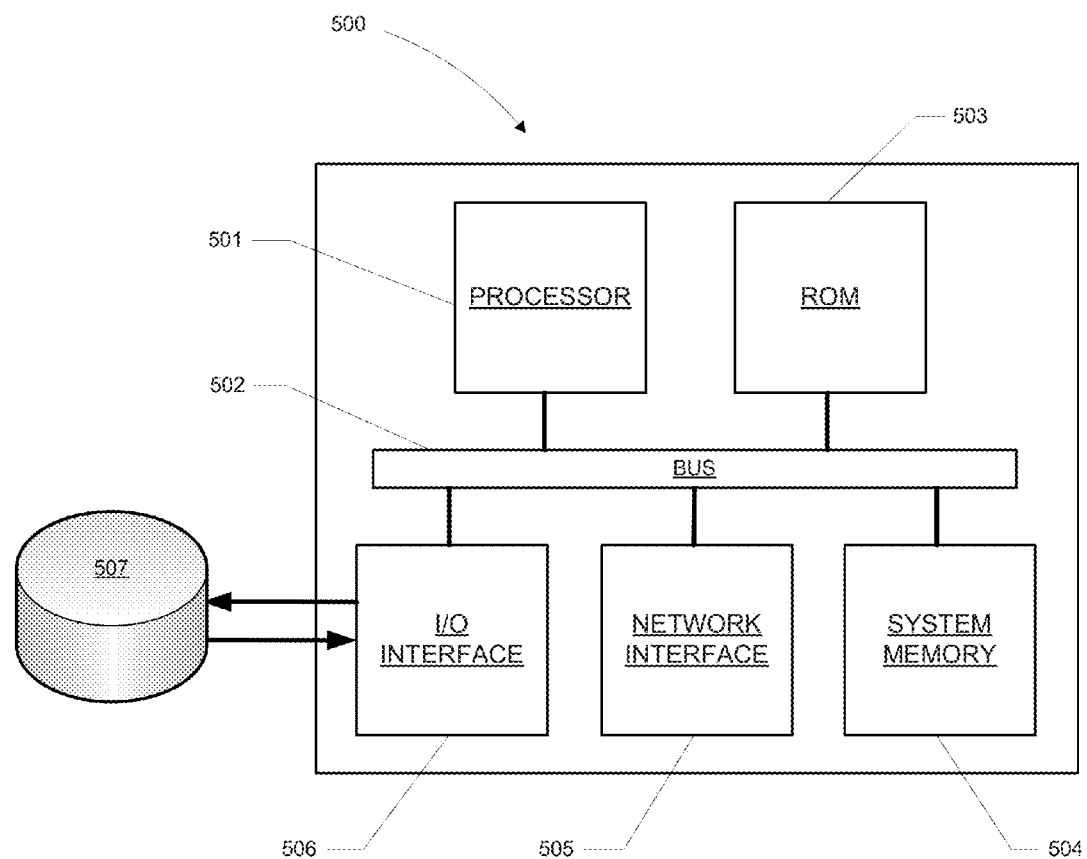
FIG. 5 is a diagram illustrating an exemplary server system for automatically receiving and displaying search results without navigating from a currently displayed webpage, including a processor and other internal components, according to one aspect of the subject technology.

FIG. 5 is a diagram illustrating an exemplary server system for automatically receiving and displaying search results without navigating from a currently displayed webpage, including a processor and other internal components, according to one aspect of the subject technology. In some aspects, a computerized device 500 (for example, computer-enabled device 401 or the like) includes several internal components such as a processor 501, a system bus 502, read-only memory 503, system memory 504, network interface 505, I/O interface 506, and the like. In one aspect, processor 501 may also be communication with a storage medium 507 (for example, a hard drive, database, or data cloud) via I/O interface 506. In some aspects, all of these elements of device 500 may be integrated into a single device. In other aspects, these elements may be configured as separate components.

Processor 501 may be configured to execute code or instructions to perform the operations and functionality described herein, manage request flow and address mappings, and to perform calculations and generate commands. Processor 501 is configured to monitor and control the operation of the components in server 500. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 501. Likewise, one or more sequences of instructions may be software stored and read from system memory 505, ROM 503, or received from a storage medium 507 (for example, via I/O interface 506). ROM 503, system memory 505, and storage medium 507 represent examples of machine or computer readable media on which instructions/code may be executable by processor 501. Machine or computer readable media may generally refer to any medium or media used to provide instructions to processor 501, including both volatile media, such as dynamic memory used for system memory 504 or for buffers within processor 501, and non-volatile media, such as electronic media, optical media, and magnetic media.

In some aspects, processor 501 is configured to communicate with one or more external devices (for example, via I/O interface 506). Processor 501 is further configured to read data stored in system memory 504 and/or storage medium 507 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 504 represents volatile memory used to temporarily store data and information used to manage device 500. According to one aspect of the subject technology, system memory 504 is random access memory (RAM) such as double data rate (DDR) RAM. Other types of RAM also may be used to implement system memory 504. Memory 504 may be implemented using a single RAM module or multiple RAM modules. While system memory 504 is depicted as being part of device 500, those skilled in the art will recognize that system memory 504 may be separate from device 500 without departing from the scope of the subject technology. Alternatively, system memory 504 may be a non-volatile memory such as a magnetic disk, flash memory, peripheral SSD, and the like.

I/O interface 506 may be configured to be coupled to one or more external devices, to receive data from the one or more external devices and to send data to the one or more external devices. I/O interface 506 may include both electrical and physical connections for operably coupling I/O interface 506 to processor 501, for example, via the bus 502. I/O interface 506 is configured to communicate data, addresses, and control signals between the internal components attached to bus 502 (for example, processor 501) and one or more external devices (for example, a hard drive). I/O interface 506 may be configured to implement a standard interface, such as Serial-Attached SCSI (SAS), Fiber Channel interface, PCI Express (PCIe), SATA, USB, and the like. I/O interface 506 may be configured to implement only one interface. Alternatively, I/O interface 506 may be configured to implement multiple interfaces, which are individually selectable using a configuration parameter selected by a user or programmed at the time of assembly. I/O interface 506 may include one or more buffers for buffering transmissions between one or more external devices and bus 502 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for automatically receiving and displaying search results, comprising:
   receiving a search query at a search toolbar on a computing device;
   transmitting the search query to a search engine and receiving search results corresponding to the search query without navigating from the currently displayed webpage;
   storing the received search results in a memory on the computing device without generating a display of the search results;
   receiving an update to the search query at the search toolbar;
   transmitting the updated search query to the search engine and receiving updated search results corresponding to the updated search query without navigating from the currently displayed webpage;
   updating the stored search results in the memory with the updated search results without generating the display of the updated search results;
   displaying a search window above and at least partially overlapping the currently displayed webpage when user input corresponding to the updated search query ceases for a predetermined period of time, the search window displaying the updated stored search results from the memory;
   closing the search window;
   navigating away from the currently displayed webpage to a new web page;
   receiving a request to reactivate the search window while the new web page is displayed; and
   displaying the search window above and at least partially overlapping the new web page, the search window including the stored search results from the memory.

2. The computer-implemented method of claim 1, wherein the currently displayed webpage is at least partially viewable below the search window.

3. The computer-implemented method of claim 1, wherein the search results are automatically updated in the search window as the search query is updated in the toolbar.

4. The computer-implemented method of claim 1, wherein the search results are presented as a paged display, the method further comprising:
   receiving a request to navigate to another page of the search results; and
   displaying the another page in the search window.

5. The computer-implemented method of claim 1, further comprising:
   receiving a request to navigate to one of the search results;
   on receiving the request, closing the search window; and
   navigating from the currently displayed webpage to a webpage corresponding to the one of the search results.

6. The computer-implemented method of claim 1, wherein the currently displayed webpage is displayed in a content area of a main window, and wherein the search window is configured to float substantially centered above the content area and track to the main window as the main window is repositioned or resized.

7. The computer-implemented method of claim 1, wherein the search results are stored in a memory-resident object, and wherein the search results are provided for display to the search window from the memory-resident object.

8. The computer-implemented method of claim 7, wherein the search results are automatically updated in the memory-resident object as the search query is updated in the toolbar.

9. The computer-implemented method of claim 7, wherein a web address representative of the search query is stored in a history log after the search query is stable for a predetermined time.

10. A non-transitory machine-readable medium having machine-executable instructions stored thereon, which when executed by a machine or computer cause the machine or computer to perform a method for automatically receiving and displaying search results, comprising:
sending to a search engine a search query received from a web browser-integrated search toolbar;
receiving and storing search results received in response to sending the search query in a memory without generating the display of the search results;
sending to the search engine an updated search query received from the web browser-integrated search toolbar;
receiving updated search results in response to sending the updated search query and updating the stored search results in the memory with the updated search results without generating a display of the updated search results;
on a determination that user input corresponding to the updated search query ceases for a predetermined period of time, displaying a pop-up content viewer, including the updated stored search results, in a content area of a web browser without navigating from a currently displayed webpage;
closing the content viewer in response to an instruction to close the content viewer;
navigating away from the currently displayed webpage to a new web page;
receiving a request to reopen the content viewer while the new web page is displayed; and
displaying the content viewer above and at least partially overlapping the new web page, the content viewer including the stored search results.

11. The non-transitory machine-readable medium of claim 10, wherein the search results are presented as a paged display in the pop-up content viewer, and wherein the search results may be navigated in the pop-up content viewer without navigating from a currently displayed webpage viewable underneath the pop-up content viewer.

12. The non-transitory machine-readable medium of claim 10, wherein the search results are automatically updated in the search window as the search query is updated in the toolbar.

13. The non-transitory machine-readable medium of claim 10, further comprising:
on receiving a request to navigate to a selected search result, closing the pop-up content viewer and navigating the web browser from the currently displayed webpage to a webpage corresponding to the selected search result.

14. The non-transitory machine-readable medium of claim 10, wherein the pop-up content viewer is configured to float substantially centered above the content area and track to the content area as the web browser is repositioned or resized.

15. The non-transitory machine-readable medium of claim 10, wherein the search results are stored in a memory-resident object, and wherein the search results are provided for display to the pop-up content viewer from the memory-resident object.

16. The non-transitory machine-readable medium of claim 15, wherein the search results are automatically updated in the memory-resident object as the search query is updated at the toolbar.

17. The non-transitory machine-readable medium of claim 15, wherein a web address representative of the search query is stored in a history file after the search query has not been updated for a predetermined time.

18. A system, comprising:
a processor;
a memory location configured as a memory-resident object;
a memory including software for generating a toolbar that, when executed by the processor, causes the processor to:
display the toolbar integrated with a web browser;
send to a search engine a search query received from the toolbar;
store search results received from the search engine in the memory-resident object without generating a display of the search results;
send to the search engine an updated search query received from the toolbar;
receive updated search results in response to sending the updated search query and update the stored search results in the memory-resident object with the updated search results without generating a display of the updated search results;
on a determination that user input corresponding to the updated search query ceases for a predetermined period of time, display a pop-up content window, including the updated stored search results in the memory-resident object, above a first webpage displayed in a content area of a web browser without navigating from the first webpage;
on receiving a request to close the pop-up content window, close the pop-up content window;
on receiving a navigation request, navigate away from the first webpage to one or more other webpages; and
on receiving a request to display the pop-up content while a second webpage is displayed in the content area, display the pop-up content window, including the search results previously stored in the memory-resident object, above the content area and second webpage.

* * * * *